United States Patent
Kim et al.

(10) Patent No.: US 7,487,388 B2
(45) Date of Patent: Feb. 3, 2009

(54) METHOD OF RECOVERING REALLOCATION SECTORS IN DATA STORAGE SYSTEM AND DISC DRIVE USING THE SAME

(75) Inventors: Se-hyun Kim, Suwon-si (KR); Jae-Ik Song, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 505 days.

(21) Appl. No.: 11/226,212

(22) Filed: Sep. 15, 2005

(65) Prior Publication Data

US 2006/0080570 A1    Apr. 13, 2006

(30) Foreign Application Priority Data

Sep. 18, 2004    (KR) .................... 10-2004-0074825

(51) Int. Cl.
G06F 11/00    (2006.01)
(52) U.S. Cl. ........................................... 714/8
(58) Field of Classification Search ............... 714/8
See application file for complete search history.

(56) References Cited

U.S. PATENT DOCUMENTS

| | | | |
|---|---|---|---|
| 5,303,219 A * | 4/1994 | Kulakowski et al. ..... 369/53.17 |
| 5,418,767 A * | 5/1995 | Gaudet et al. ............ 369/53.16 |
| 6,034,831 A | 3/2000 | Dobbek et al. |
| 6,118,608 A * | 9/2000 | Kakihara et al. .............. 360/53 |
| 6,289,484 B1 * | 9/2001 | Rothberg et al. ............ 714/769 |
| 6,384,999 B1 * | 5/2002 | Schibilla ..................... 360/53 |
| 6,530,034 B1 * | 3/2003 | Okada et al. .................... 714/5 |
| 2003/0163759 A1 * | 8/2003 | Arakawa ....................... 714/8 |

FOREIGN PATENT DOCUMENTS

| | | |
|---|---|---|
| JP | 8-180612 | 7/1996 |
| JP | 10-255403 | 9/1998 |
| KR | 2000-47533 | 7/2000 |

* cited by examiner

*Primary Examiner*—Marc Duncan
(74) *Attorney, Agent, or Firm*—Staas & Halsey LLP

(57) ABSTRACT

A reallocation sector recovering system and method reducing a number of reallocation sectors by selectively recovering reallocation sectors, and a disc drive implementing the same. The reallocation sector recovering method in a data storage system may include determining whether a predetermined processing condition of a reallocation recovering process has been satisfied, reading data from reallocation sectors using reallocation list information and rewriting the data in original sectors corresponding to the reallocation sectors, respectively. The process may further include determining whether the data rewritten on the original sectors has successfully been read without generation of a reallocation condition, such that, if the data is successfully read without generation of the reallocation condition, the reallocation sectors may be substituted by the original sectors, respectively, and information of the reallocation sectors may be deleted from the reallocation list information.

19 Claims, 4 Drawing Sheets

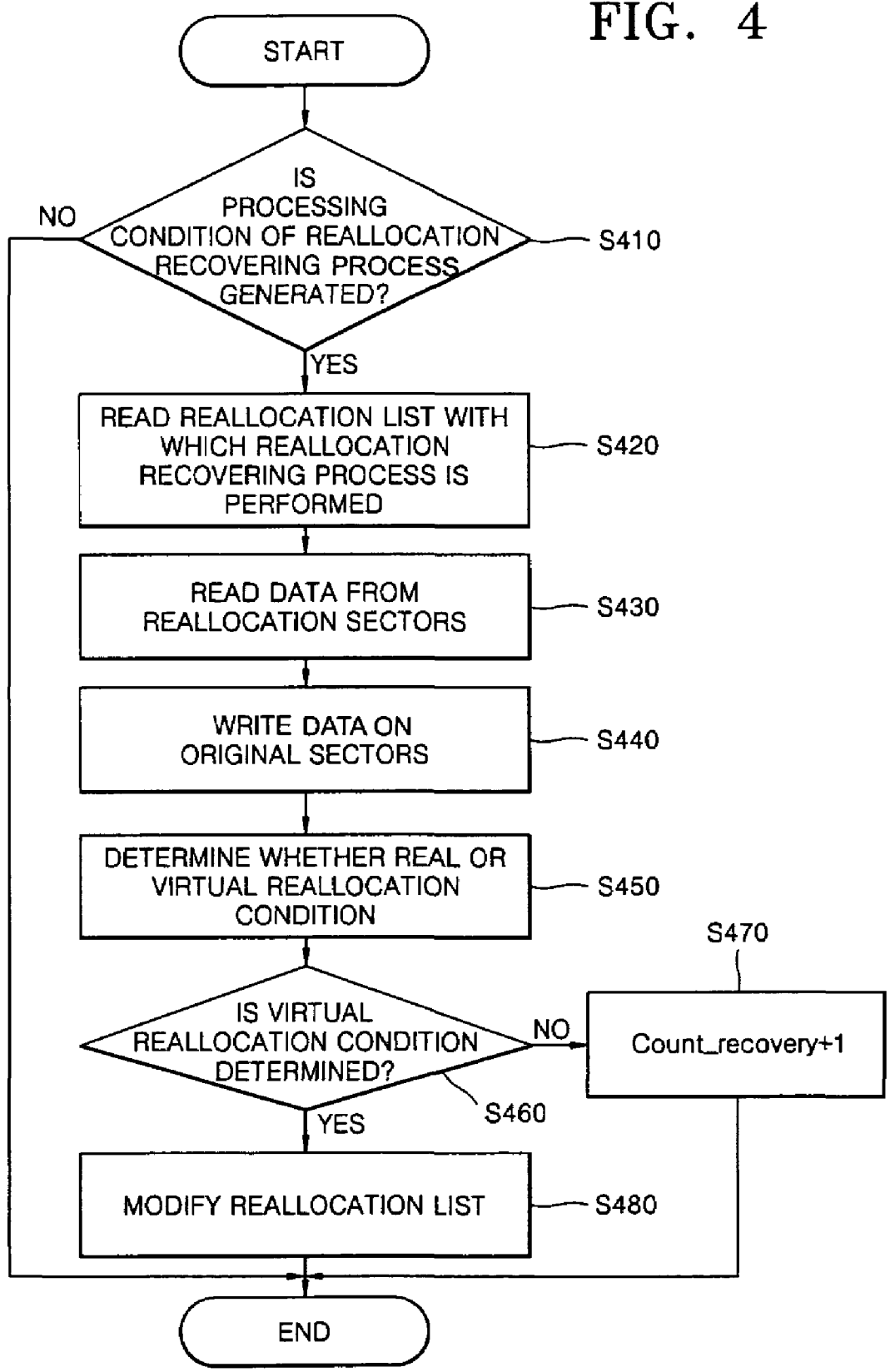

US 7,487,388 B2

METHOD OF RECOVERING REALLOCATION SECTORS IN DATA STORAGE SYSTEM AND DISC DRIVE USING THE SAME

CROSS-REFERENCE TO RELATED APPLICATIONS

This application claims the priority benefit of Korean Patent Application No. 10-2004-0074825, filed on Sep. 18, 2004, in the Korean Intellectual Property Office, the disclosure of which is incorporated herein in its entirety by reference.

BACKGROUND OF THE INVENTION

1. Field of the Invention

Embodiments of the present invention relate to a recording and/or reproducing apparatus and method with sector reallocation, and more particularly, to an apparatus and method with reallocation sector recovery for reducing the number of reallocation sectors by selectively recovering reallocation sectors.

2. Description of the Related Art

Embodiments of the present invention are related to technologies disclosed in Korea Patent Publication No. 2000-0047533 and U.S. Pat. No. 6,034,831.

Correspondingly, hard disc drives (HDDs) are a type of data storage device that record and/or reproduce data to/from a disc using a magnetic head. According to the recent trend for high capacities, higher densities, and greater compactness in HDDs, the number of bits per inch (BPI), denoting the recording density in a disc rotating direction, and the number of tracks per inch (TPI), denoting the recording density in a disc diameter direction, have increased. Accordingly, a more elaborate operation mechanism is required for HDDs.

A HDD may read and/or write data by rotating a disc at a constant speed rotation using a spindle motor, reading servo information of the disc at the same time interval using a transducer (head), and determining locations of data sectors based on the read servo information.

When a write error is generated, and a read operation in a specific condition is successfully performed thereafter, the HDD can reallocate an original sector to a substitute sector, e.g., in a spare cylinder area.

The maximum number of sectors which can be reallocated is limited and differs between HDDs. Therefore, when a reallocation request, exceeding the maximum number of sectors which can be reallocated, is generated, bad sectors are generated on a disc. Accordingly, the disc cannot operate normally.

A reallocation process can be initiated due to an external cause, such as an impact or vibration. However, not all generated reallocation sectors, generated due to external causes, actually correspond to a real reallocation condition.

According to the conventional methodologies, since there is no process for recovering reallocation sectors when the reallocation sectors have been generated because of temporary causes, such as an impact or vibrations, the number of reallocation sectors available becomes reduced. Therefore, since there are no more sectors available for substitution, when all of the reallocation sectors have been used due to the temporary external causes, a corresponding disc cannot operate normally upon the occurrence of bad sectors.

SUMMARY OF THE INVENTION

Embodiments of the present invention include a method for recovering reallocation sectors in a data storage system in order to reduce a total number of reallocation sectors by recovering virtual sectors, reallocated due to temporary external causes, and a disc drive using the same.

To achieve the above and/or other aspects and advantages, embodiments of the present invention include a method of recovering reallocation sectors in a data storage system, the method including reading data from reallocation sectors using reallocation list information and rewriting the read data to original sectors corresponding to the reallocation sectors, respectively, if a predetermined processing condition of a reallocation recovering process is satisfied, determining whether the rewritten data of the original sectors is successfully read without generation of a reallocation condition, and substituting the reallocation sectors by the original sectors, respectively, and deleting information of the reallocation sectors from the reallocation list information, if the data is successfully read without generation of the reallocation condition.

The predetermined processing condition of the reallocation recovering process may include a condition of transiting to a power-on mode, a condition in which a total number of reallocation sectors included in the reallocation list information is greater than a predetermined number, and/or a condition in which a command to perform the reallocation recovering process is received from a host device, for example. In addition, a total number of sectors, for which the reallocation recovering process is performed, of the reallocation list information, for one reallocation recovering process, may be limited. The reallocation condition may be capable of including a condition in which data read in a specific condition succeeds and a condition in which a write process cannot be normally performed. Further, the reallocation recovering process may be limited such that the reallocation recovering process is not performed in a particular sector more than a predetermined count.

To achieve the above and/or other aspects and advantages, embodiments of the present invention include a disc drive, the disc drive including a host interface to perform a data transmission and/or reception process with a host device, a memory to store reallocation list information, a buffer to store data received from the host device via the host interface and data read from a disc, a controller to control the disc drive to determine whether a predetermined processing condition of a reallocation recovering process is satisfied, and if the predetermined processing condition of the reallocation recovering process is satisfied, read data from sectors at reallocated places using the reallocation list information, rewrite the read data to sectors of the disc at original places, read the rewritten data from the sectors at the original places, and determine whether the data rewritten to the sectors at the original places satisfies a reallocation condition, and if the data rewritten to the sectors at the original places does not satisfy the reallocation condition, substitute the reallocation sectors with the original sectors, respectively, and delete information of the reallocation sectors from the reallocation list information, and a write and/or read circuit to write and/or read data to/from the disc and to perform data processing for storing the written and/or read data in the buffer.

To achieve the above and/or other aspects and advantages, embodiments of the present invention include a drive controller, to control a drive to determine whether a predetermined processing condition of a reallocation recovering process is satisfied, and if the predetermined processing condition of the reallocation recovering process is satisfied, read data from sectors of a medium at reallocated places using reallocation list information for the medium, rewrite the read data to sectors of the medium at original places, read the rewritten data from the sectors at the original places, and determine whether the data rewritten to the sectors at the original places satisfies a reallocation condition, and if the data rewritten to the sectors at the original places does not satisfy the reallocation condition, substitute the reallocation sectors with the original sectors, respectively, and delete information of the reallocation sectors from the reallocation list information.

To achieve the above and/or other aspects and advantages, embodiments of the present invention include at least one medium including computer readable code to implement embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a flowchart illustrating a reallocation sector recovering method, according to an embodiment of the present invention.

DETAILED DESCRIPTION OF THE PREFERRED EMBODIMENTS

Figure 1:
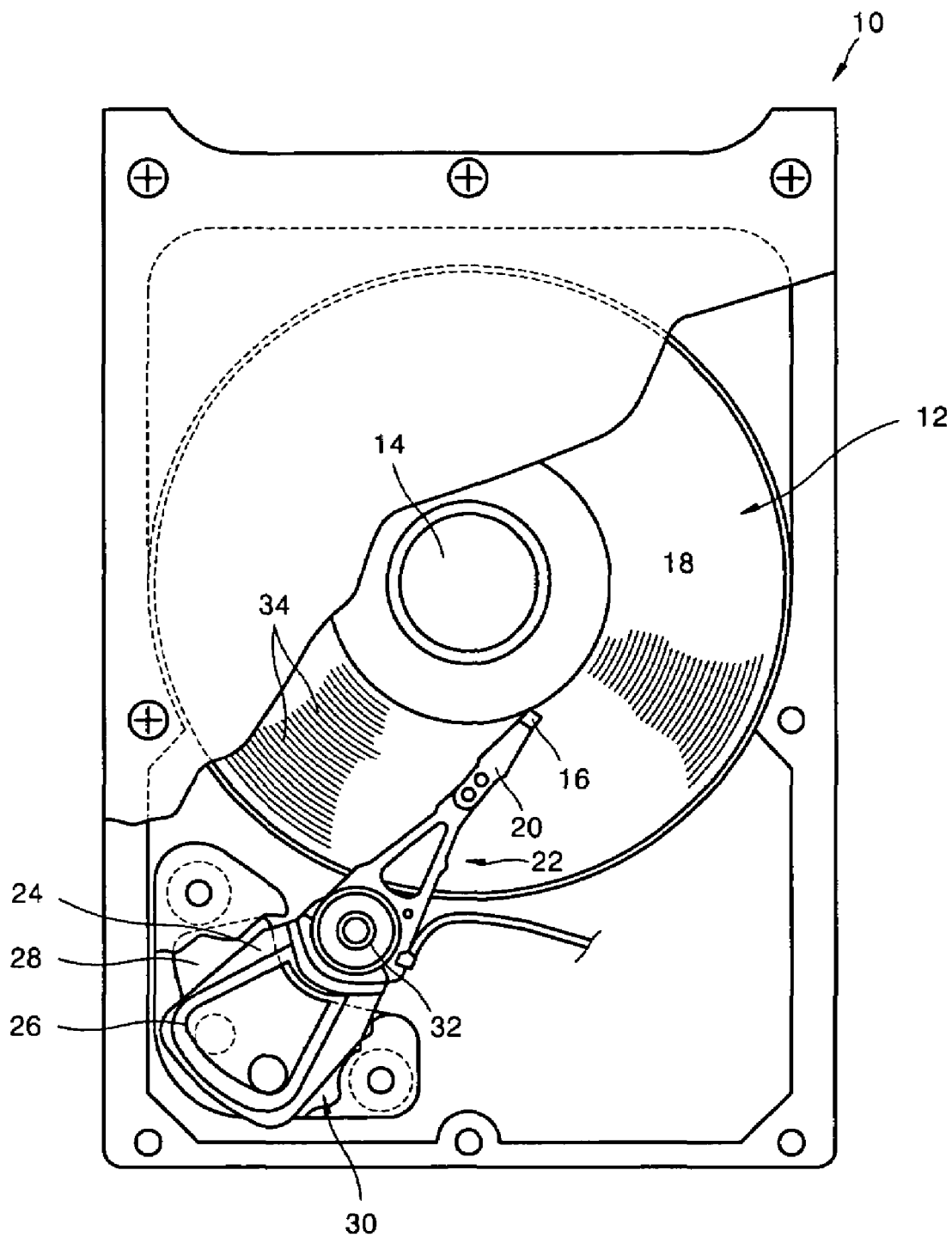
FIG. 1 illustrates a disc drive, according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

FIG. 1 illustrates a disc drive 10 implementing an embodiment of the present invention. Referring to FIG. 1, the disc drive 10 may include at least one magnetic disc 12 rotated by a spindle motor 14. The disc drive 10 may further include a transducer 16 located adjacent to a disc surface 18.

The transducer 16 may read and/or write information from/to the rotating disc 12 by sensing magnetic fields formed on the disc surface 18 or by magnetizing the disc surface 18. Though a single transducer 16 is shown in FIG. 1, the transducer 16 may include a write transducer to magnetize an area of the disc 12 and/or a read transducer to sense a magnetic field of an area of the disc 12. The read transducer may include a magneto-resistive (MR) component. The transducer 16 may be commonly called a head, for example.

The transducer 16 may also be combined with a slider 20. The slider 20 generates an air bearing between the transducer 16 and the disc surface 18. The slider 20 can be incorporated into a head gimbal assembly (HGA) 22, and the HGA 22 may be attached to an actuator arm 24 having a voice coil 26. The voice coil 26 can be located adjacent to a magnetic assembly 28 to define a voice coil motor (VCM) 30. Current supplied to the voice coil 26 generates a torque which rotates the actuator arm 24 around a bearing assembly 32, And the rotation of the actuator arm 24 then moves the transducer 16 across the disc surface 18.

Information may be stored in annular tracks on the disc 12. In general, each track 34 includes a plurality of sectors, and each sector may include a data field and an identification field. The identification field may include a Gray code identifying the sector and track (cylinder). Accordingly, the transducer 16 moves across the disc surface 18 in order to read an/or write information from/to another track.

Figure 2:
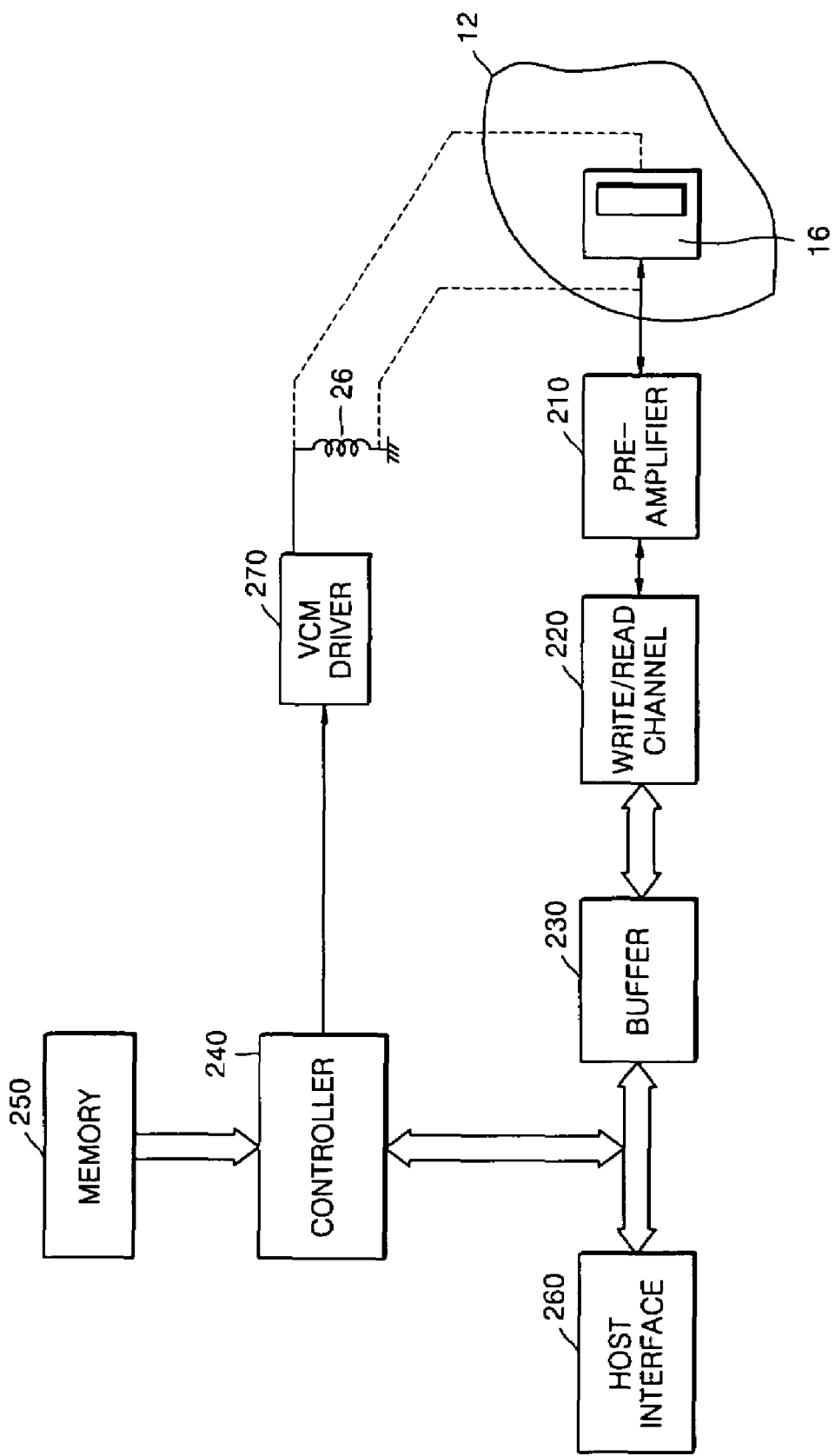
FIG. 2 illustrates an electrical circuit configuration for a disc drive, such as that of FIG. 1, according to an embodiment of the present invention.

FIG. 2 illustrates an electrical circuit of a disc drive, according to an embodiment of the present invention.

Referring to FIG. 2, the disc drive 10 may include the disc 12, the transducer 16, a pre-amplifier 210, write/read channel 220, a buffer 230, a controller 240, a memory 250, a host interface 260 and a VCM driver 270, for example.

A circuit including the pre-amplifier 210 and the write/read channel 220 may also be called a write/read circuit.

Figure 3:
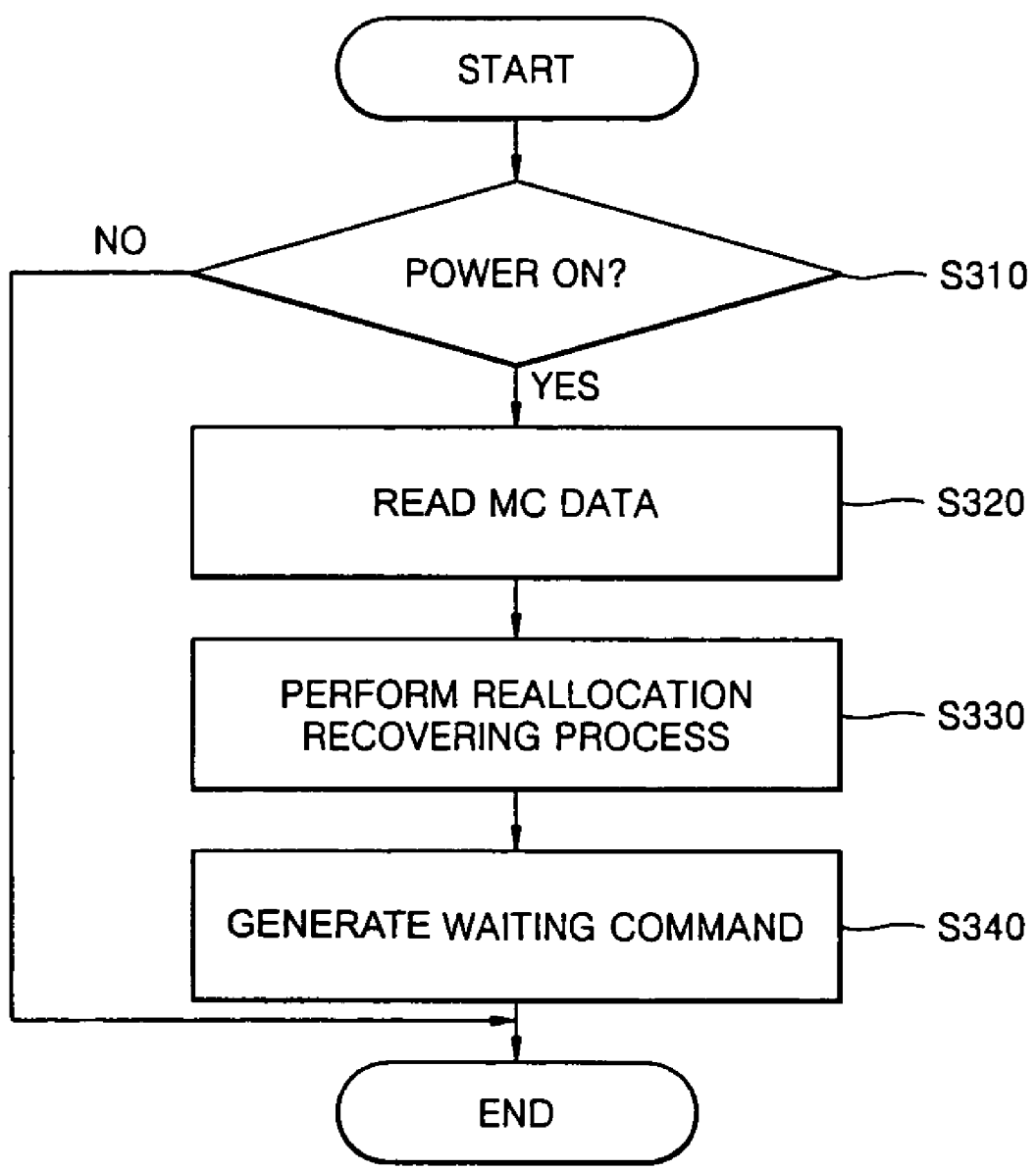
FIG. 3 is a flowchart illustrating a reallocation recovering method when a disc drive is powered on, according to an embodiment of the present invention.

In the memory 250, computer readable code, e.g., various programs, and data for controlling the disc drive 10 could be stored, and more particularly, programs and data to perform a method of recovering reallocation sectors, according to embodiments of the present invention, e.g., as shown in FIGS. 3 and 4, may be stored. Also, when the disc drive 10 is initialized, reallocation list information read from a maintenance cylinder of the disc 12 can be stored in the memory 250. The reallocation list information can include reallocation sector location information, original sector location information, and information of a reallocation recovering process execution accumulation count, for example.

A conventional operation of the disc drive 10 will now be described.

In a data read mode, the disc drive 10 amplifies an electrical signal sensed by the transducer 16 (called a head) using the pre-amplifier 210. The disc drive 10 then encodes the amplified analog signal into a digital signal that can be read by a host device (not shown) using the write/read channel 220, converts the digital signal to stream data, temporarily stores the stream data in the buffer 230, and then transmits the stream data to the host device via the host interface 260.

In a data write mode, the disc drive 10 receives data from the host device via the host interface 260, temporarily stores the data in the buffer 230, sequentially outputs the data stored in the buffer 230, converts the sequentially output data to a binary data stream suitable for a write channel using the write/read channel 220, and writes the data using a write current amplified by the pre-amplifier 210 to the disc 12 through the transducer 16.

The controller 240 can control the disc drive 10, and more particularly, control the disc drive 10 to perform a reallocation process in which original sectors are substituted by predetermined substitute sectors of a spare cylinder area when a write error is generated or a read operation, under a specific condition, succeeds. The spare cylinder area, for example, may be set to the last N (for example, N=2) cylinders in each zone divided in the disc 12.

A specific condition when the reallocation process is performed in a read mode may be set to the case where a data read succeeds after a specific retry, the case where a data read succeeds after a predetermined retry, and the case where a data read succeeds using a soft error correction code (ECC).

Such cases where the write error is generated may include the case where a scratch is generated on the disc 12, the case where a burst or gray signal is damaged, and the case where a location error signal is abnormal.

Here, the controller 240 may control the disc drive 10 to perform a reallocation sector recovering process, according to an embodiment of the present invention. That is, the controller 240 may control the disc drive 10 to determine whether the disc drive 10 has satisfied a processing condition of the reallocation recovering process, and if the processing condition of the reallocation recovering process has been satisfied, the controller 240 may control the disc drive 10 to read data from sectors at reallocated places using the reallocation list information read from the memory 250, rewrite the data to sectors at their associated original places, read the data rewritten on the sectors at the original places, and determine whether the data rewritten on the sectors at the original places satisfies the reallocation condition, delete information of the reallocation sector from the reallocation list information if the data rewritten on the sectors at the original places does not satisfy the reallocation condition as the determining results, and increase the number of counts accumulated every time when the reallocation recovering process is executed for the reallocation sectors in a reallocation list, e.g., by 1 if the data rewritten on the sectors at the original places satisfies the reallocation condition as the determining results.

The controller 240 may be designed to control the disc drive 10 to limit the total number of sectors for which the reallocation recovering process is performed, in the reallocation list for one reallocation recovering process, and limit the reallocation recovering process execution accumulation count so that the reallocation recovering process is not performed in the same sector more than a predetermined count.

A reallocation sector recovering method, according to further embodiments of the present invention, will now be described with reference to FIGS. 3 and 4.

FIG. 3 is a flowchart illustrating a reallocation recovering process when a disc drive is powered on and initialized.

Referring to FIG. 3, the controller may determine whether the disc drive 10 transits from a power-off state to a power-on state, in operation S310.

When the disc drive 10 transits to the power-on state, as a determining result of operation S310, the controller 240 may read various kinds of information desired for a disc drive operation, e.g., from a maintenance cylinder area of the disc 12, and store the information in the memory 250, in operation S320. The information desired for the disc drive operation may include the reallocation list information, for example.

The reallocation recovering process may be automatically performed, in operation S330, with such a detailed operation of a reallocation recovering process being described in greater detail below, referencing FIG. 4.

After the reallocation recovering process is finished, the controller 240 may control the disc drive 10 to transit to a stand-by state by generating a waiting command, in operation S340.

Another reallocation recovering process, according to an embodiment of the present invention, will now be described with reference to FIG. 4.

Referring to FIG. 4, the controller 240 may determine whether a processing condition of the reallocation recovering process is generated, in operation S410. For example, a processing condition of the reallocation recovering process can be designed for the case where the disc drive 10 transits from the power-off state to the power-on state, the case where the total number of reallocation sectors included in the reallocation list information exceeds a predetermined number, and the case where a command to perform the reallocation recovering process is received from the host device.

When the processing condition of the reallocation recovering process is generated, based on a determining result of operation S410, the controller 240 may read the reallocation list information, with which the reallocation recovering process is going to be performed, from the memory 250, in operation S420. Here, as an example, it is effective that the reallocation recovering process is performed only for reallocation sectors whose reallocation recovering process execution accumulation counts are less than a predetermined threshold and not for all reallocation sectors included in the reallocation list.

Data can be read from sectors at reallocated places that are registered in the reallocation list information, in operation S430, and data from the reallocation sectors can be written to original sectors, respectively, in operation S440.

A process of determining whether reallocated states correspond to real or virtual reallocation conditions is performed in operation S450. In detail, in the process of determining the real or virtual reallocation condition, by determining whether the data rewritten on the original sectors, in operation S440, was successfully read without generation of the reallocation condition, a virtual reallocation condition can be determined to exist if the data is successfully read without generation of the reallocation condition. Correspondingly, a real reallocation condition can be determined to exist if the data cannot be successfully read without generation of the reallocation condition.

Here, the controller 240 may then determine whether the virtual reallocation condition has been determined, in operation S460.

When the virtual reallocation condition has been determined, a reallocation list modification process of deleting information in sectors reallocated, by substituting the original sectors from the reallocation list information, can be then be performed, in operation S480. Accordingly, original, i.e., pre-reallocation, sectors can be normally used.

However, when the real reallocation condition has been determined, reallocation recovering process execution accumulation counts of reallocation sectors, for which real reallocation condition has been determined, included in the reallocation list information, can be increased by 1, in operation S470. Each reallocation recovering process execution accumulation count may be referenced for when not to perform the reallocation recovering process for the same sector more than a predetermined count.

It may be effective that a total number of sectors, for which the reallocation recovering process is performed, in the reallocation list, be limited whenever a processing condition of the reallocation recovering process is generated.

As described above, according to embodiments of the present invention, a number of reallocation sectors may be reduced by instructing a disc drive to delete reallocation sectors, e.g., generated due to only temporary causes, from a reallocation list, using a reallocation recovering process and again normally use the original sectors corresponding to the deleted reallocation sectors.

Embodiments of the present invention may be realized as a method, an apparatus, and/or a system, for example. When embodiments of the present invention are realized as computer readable code, e.g., software, components of the same may be embodied as code segments, for example, for executing required operations. Computer readable code, e.g., a program or code segment(s), may be stored in a medium, e.g., a processor readable recording medium, and/or transmitted on/through a medium as data signals, e.g., as combined with a carrier using a transmission medium or a communication network. The medium may be any data storage device that can store and/or transmit data that can be thereafter read by a computer system. Examples of the medium may include electronic circuits, semiconductor memory devices, read-only memory (ROM), flash memory, erasable ROM, floppy disks, optical discs, hard discs, optical fiber media, and RF networks, for example. The data signals may also include any signal that can be stored and/or propagated via transmission media such as electronic network channels, optical fibers, air, electronic fields, RF networks, also for example.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of recovering reallocation sectors in a data storage system, the method comprising:
    reading data from reallocation sectors using reallocation list information and rewriting the read data to original sectors corresponding to the reallocation sectors, respectively, if a predetermined processing condition of a reallocation recovering process is satisfied;
    determining whether the rewritten data of the original sectors is successfully read without generation of a reallocation condition; and
    substituting the reallocation sectors by the original sectors, respectively, and deleting information of the reallocation sectors from the reallocation list information, if the data is successfully read without generation of the reallocation condition,
    wherein the reallocation recovering process is limited such that the reallocation recovering process is not performed in a particular sector more than a predetermined count.

2. The method of claim 1, wherein the predetermined processing condition of the reallocation recovering process comprises a condition of transiting to a power-on mode.

3. The method of claim 1, wherein the predetermined processing condition of the reallocation recovering process comprises a condition in which a total number of reallocation sectors included in the reallocation list information is greater than a predetermined number.

4. The method of claim 1, wherein the predetermined processing condition of the reallocation recovering process comprises a condition in which a command to perform the reallocation recovering process is received from a host device.

5. The method of claim 1, wherein a total number of sectors, for which the reallocation recovering process is performed, of the reallocation list information, for one reallocation recovering process, is limited.

6. The method of claim 1, wherein the reallocation condition is capable of comprising a condition in which data read in a specific condition succeeds and a condition in which a write process cannot be normally performed.

7. A disc drive, the disc drive comprising:
    a host interface to perform a data transmission and/or reception process with a host device;
    a memory to store reallocation list information;
    a buffer to store data received from the host device via the host interface and data read from a disc;
    a controller to control the disc drive to determine whether a predetermined processing condition of a reallocation recovering process is satisfied, and if the predetermined processing condition of the reallocation recovering process is satisfied, read data from sectors at reallocated places using the reallocation list information, rewrite the read data to sectors of the disc at original places, read the rewritten data from the sectors at the original places, and determine whether the data rewritten to the sectors at the original places satisfies a reallocation condition, and if the data rewritten to the sectors at the original places does not satisfy the reallocation condition, substitute the reallocation sectors with the original sectors, respectively, and delete information of the reallocation sectors from the reallocation list information; and
    a write and/or read circuit to write and/or read data to/from the disc and to perform data processing for storing the written and/or read data in the buffer,
    wherein the reallocation recovering is limited such that reallocation recovering is not performed in a particular sector more than a predetermined count.

8. The disc drive of claim 7, wherein the predetermined processing condition comprises a condition of transiting to a power-on mode.

9. The disc drive of claim 7, wherein the predetermined processing condition comprises a condition in which a total number of reallocation sectors included in the reallocation list information is greater than a predetermined number.

10. The disc drive of claim 7, wherein the predetermined processing condition comprises a condition in which a command to perform the reallocation recovering is received from the host device.

11. The disc drive of claim 7, wherein a total number of sectors, for which the reallocation recovering is performed, in the reallocation list information, for one reallocation recovering operation, is limited.

12. The disc drive of claim 7, wherein the reallocation condition is capable of comprising a condition in which data read in a specific condition succeeds and a condition in which a write process cannot be normally performed.

13. A drive controller, to control a drive to determine whether a predetermined processing condition of a reallocation recovering process is satisfied, and if the predetermined processing condition of the reallocation recovering process is satisfied, read data from sectors of a medium at reallocated places using reallocation list information for the medium, rewrite the read data to sectors of the medium at original places, read the rewritten data from the sectors at the original places, and determine whether the data rewritten to the sectors at the original places satisfies a reallocation condition, and if the data rewritten to the sectors at the original places does not satisfy the reallocation condition, substitute the reallocation sectors with the original sectors, respectively, and delete information of the reallocation sectors from the reallocation list information,
    wherein the reallocation recovering is limited such that reallocation recovering is not performed in a particular sector more than a predetermined count.

14. The drive controller of claim 13, wherein the predetermined processing condition comprises a condition of transiting to a power-on mode.

15. The drive controller of claim 13, wherein the predetermined processing condition comprises a condition in which a total number of reallocation sectors included in the reallocation list information is greater than a predetermined number.

16. The drive controller of claim 13, wherein the predetermined processing condition comprises a condition in which a command to perform the reallocation recovering is received from a host device.

17. The drive controller of claim 13, wherein a total number of sectors, for which the reallocation recovering is performed, in the reallocation list information, for one reallocation recovering operation, is limited.

18. The drive controller of claim 13, wherein the reallocation condition is capable of comprising a condition in which data read in a specific condition succeeds and a condition in which a write process cannot be normally performed.

19. At least one computer-readable storage medium having stored thereon computer readable code to implement the method of claim 1.

* * * * *